(12) United States Patent
Allender

(10) Patent No.: US 6,894,445 B2
(45) Date of Patent: May 17, 2005

(54) CATHODE RAY TUBE PHOSPHOR PROTECTION

(75) Inventor: Jeffrey Owen Allender, Morristown, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/213,934

(22) Filed: Aug. 7, 2002

(65) Prior Publication Data

US 2003/0057839 A1 Mar. 27, 2003

Related U.S. Application Data

(60) Provisional application No. 60/316,241, filed on Aug. 31, 2001.

(51) Int. Cl.$^7$ ................................................ H01J 29/58
(52) U.S. Cl. ..................... 315/382; 315/382.1; 315/370
(58) Field of Search ................................. 315/381, 382, 315/382.1, 393, 384, 385, 386, 389, 370, 371, 8, 383

(56) References Cited

U.S. PATENT DOCUMENTS

| | | | |
|---|---|---|---|
| 4,287,506 A | * 9/1981 | Richards | 315/370 |
| 4,698,557 A | * 10/1987 | Harlos | 315/383 |
| 5,043,639 A | 8/1991 | Gurley et al. | 315/386 |
| 5,130,615 A | * 7/1992 | George | 315/381 |
| 5,345,267 A | 9/1994 | Flickner | 348/379 |
| 5,369,341 A | * 11/1994 | Wilber | 315/389 |
| 5,729,092 A | * 3/1998 | Gorog et al. | 315/8 |

FOREIGN PATENT DOCUMENTS

EP           0 975 151 A          1/2000

* cited by examiner

*Primary Examiner*—Wilson Lee
(74) *Attorney, Agent, or Firm*—Joseph S. Tripoli; Joseph J. Laks; Christine Johnson

(57) ABSTRACT

A cathode ray tube video display comprises a cathode ray tube (CRT) for displaying a video signal (Vin) coupled thereto. A cathode ray tube electron beam blanker (201) is coupled to the cathode ray tube (CRT) and is responsive to a blanking trigger signal (GK) for blanking an electron beam (e) within the cathode ray tube (CRT). A blanking controller (200) is coupled to the cathode ray tube electron beam blanker (201) and generates the blanking trigger signal (Gk) for controlling electron beam blanking, wherein the electron beam (e) is blanked for different durations in accordance with one of a hot and cold start condition.

6 Claims, 2 Drawing Sheets

CATHODE RAY TUBE PHOSPHOR PROTECTION

This application claims the benefit of provisional application Ser. No. 60/316,241, filed Aug. 31, 2001.

This invention relates to cathode ray tube display devices and in particular to the prevention of display phosphor damage.

BACKGROUND OF THE INVENTION

Cathode ray tube displays frequently employ circuit arrangements that protect the display phosphor from damage or the presentation of spurious imagery during events such as scanning loss or deflection power supply termination or failure. Typically these protection circuits detect or anticipate the occurrence of the event and upon detection activate circuitry which can, for example, apply a bias to the cathode ray tube grid sufficient to blank or cut off electron beam within the tube. In a tri-color cathode ray tube a metal mask is typically employed to ensure that the individual color phosphors are only illuminated by electrons emitted from the corresponding gun. Consequently this mask intercepts a significant percentage of the electron beam current projected toward the phosphor display surface. Thus, the likelihood of phosphor damage or emission fatigue resulting from an undeflected beam is significantly reduced, however, to eliminate spurious turnoff imagery, displays employing such tubes often use circuitry to bias or kick the CRT grid to a blanking or cutoff potential to prevent the display of these unwanted turnoff artifacts.

It is known in some cathode ray tube display devices, often selectably operable at a plurality of scanning frequencies, to employ a tube power supply that is electronically separate from the deflection generator. Clearly in such a display, phosphor protection circuitry is required because the supply of power to the tube is not driven, energized or derived from a deflection waveform, hence phosphor damage can result from deflection failure with sustained CRT power.

In a cathode ray tube projection display, phosphor protection circuitry is most critical because each tube has a single monochrome phosphor and consequently lacks the internal metal mask of the tri-color display. In addition a projection tube is small, for example 7 inches in diameter, when compared with a 32 inch tri-color display tube, thus the ratio of picture power to tube size is significantly greater in a projection tube than in a direct view tube. Hence the beam current density in the projection tube causes significantly greater power to be dissipated by the phosphor. Thus without protection circuitry, any turn on or turn off flash or image, centered on the tube face can result in phosphor damage. The phosphor can suffer localized emission fatigue which can permanently reduce light output and thereby retain an image of the flash. If the transient event is severe the phosphor can be burnt precluding further light emission from that phosphor location.

SUMMARY OF THE INVENTION

In an advantageous arrangement a cathode ray tube video display comprises a cathode ray tube for displaying a video signal coupled thereto. A cathode ray tube electron beam blanker is coupled to the cathode ray tube and is responsive to a blanking trigger signal for blanking an electron beam within the cathode ray tube. A blanking controller is coupled to said cathode ray tube electron beam blanker and generates the blanking trigger signal for controlling electron beam blanking, wherein the electron beam is blanked for different durations in accordance with one of a hot and cold start condition.

In a further advantageous arrangement a cathode ray tube video display comprises a cathode ray tube for displaying a video signal coupled thereto. A cathode ray tube electron beam blanker is coupled to the cathode ray tube and is responsive to a blanking trigger signal for blanking an electron beam within the cathode ray tube. A blanking controller is coupled to the cathode ray tube electron beam blanker and generates the blanking trigger signal for controlling electron beam blanking, wherein the electron beam is blanked for different durations in accordance with one of a turn on and turn off condition.

DETAILED DESCRIPTION

Figure 1:
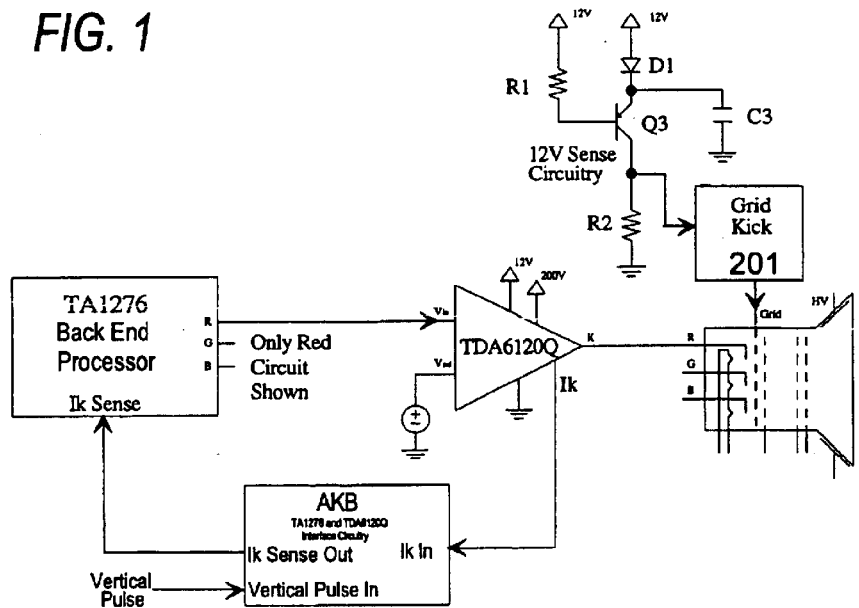
FIG. 1 depicts a phosphor protection arrangement with scan and power loss detection.

Protection circuits are known which detect the loss of scanning waveforms or a power supply, such an exemplary tri-color tube circuit arrangement is depicted in FIG. 1. However, the arrangement of FIG. 1 is equally applicable to a CRT projection arrangement where individual grid kick circuits, connected to the control grid of each display tube, are driven from a single power and scan failure arrangement.

In FIG. 1, an automatic kine bias (AKB) circuit is supplied with a vertical scan signal as part of a vertical scan loss detection circuit. When the vertical scan is lost, the tube bias is slowly changed reducing the beam current until the beam is cutoff. However, this method has a slow response time but does prevent damage to the picture tube. In FIG. 1, 12V power sensing is provided by transistor Q3 and diode D1. The combination of diode D1 and capacitor C3 at the emitter of transistor Q3 prevent the 12V supply from dropping quickly when the 12V supply is lost, for example at turn off or supply failure. After turnoff the 12V supply coupled the base of the transistor Q3 decays towards ground via resistor R1 causing transistor Q3 to turn on thereby activating a grid kick circuit, such as the exemplary arrangement of FIG. 4.

Although the circuit depicted in FIG. 1 provides detection of both vertical scan failure and 12V power loss, it fails to provide protection against damaging turn on flashes. In addition because the AKB circuit exhibits a long response time when subject to scan failure, the AKB arrangement allows the collapsing scan to be displayed before the CRT is blanked.

There are significant differences in beam blanking requirements at the time of display power up and power down. Cathode ray tube phosphor protection is required under the following conditions:

Power down:
  blank the beam responsive to user controlled power down,
  blank the beam upon deflection power supply failure,
  blank the beam upon deflection failure,
Power up:
  blank the beam at power up cold,
  blank the beam at power up hot.

At power down two visible artifacts are presented, namely a flash or scan perturbation of short duration but potentially high brightness followed by a slowly decaying glow representative of the last image. Clearly power down beam blanking is required to be fast acting, to prevent a visible flash, and in addition blanking must be sustained for a sufficient period to suppress any image after glow.

At display power up visible artifacts are presented but these can vary in duration and intensity dependent on the operational condition of the display at turn off, and the elapsed time since last energized. For example, a power off power on cycle time of less than a few minutes can be termed a hot start because the tube heaters have not fully cooled and are thus capable of rapid electron emission, unlike tube heaters quiescent for an hour or more. Thus it can be appreciated that rapid power on detection is required, particularly with a hot start condition. Furthermore, to avoid user irritation, an unnecessarily long beam blanking period must be avoided to prevent any additional delay in image presentation. However, with cold tube heaters, the so called cold start, turn on display artifacts can be delayed in occurrence relative to the hot start condition thus requiring a slightly extended beam blanking period.

Figure 2:
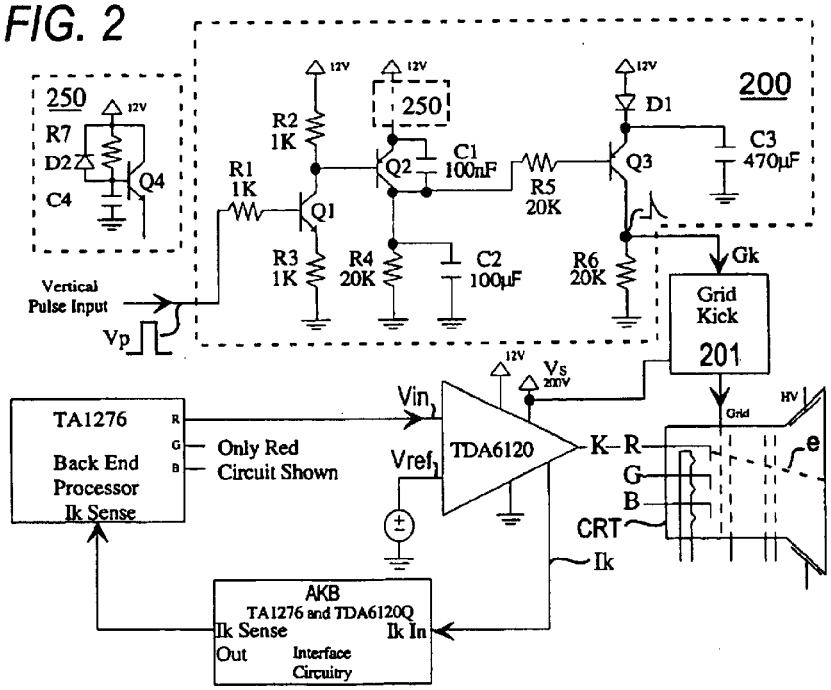
FIG. 2 depicts an inventive phosphor protection arrangement.

The recognition of the differing requirements for beam blanking at power up and power down, namely quick blanking and unblanking at turn on with quick sustained blanking at turn off, resulted in the advantageous arrangement of FIG. 2. At turn on, beam blanking must obscure any turn on display artifacts but must terminate prior to video signal availability at the kinescope cathode(s). With any power down scenario, beam blanking must turn on quickly and sustain a blanked condition for a considerably longer period than that required at turn on. Stated differently, at turn on the beam is quickly blanked then unblanking to avoid extending any on screen picture absence, however, at power down the beam is rapidly blanked and sustained to preclude any on screen image visibility.

To prevent the display of the turn on flash, the advantageous arrangement 200 of FIG. 2 is used to activate a grid kick or grid biasing circuit which blanks the CRT beam (e). Although the arrangement of FIG. 2 illustrates a tri-color tube, inventive detector 200 is equally applicable to a CRT projection arrangement where individual grid kick circuits, connected to the control grid of each display tube, are driven from a single power and scan failure arrangement. The arrangement of detector 200 also detects failure of vertical deflection and turn off events, such as power fail and user turn off, all of which cause beam blanking to be activated. In addition vertical scan failure is rapidly detected when compared with the arrangement of circuit of FIG. 1.

In inventive circuit 200 of FIG. 2, a 5 volt vertical rate pulse, occurring during the vertical blanking interval is coupled to a vertical scan loss and 12V power sensing circuit. The vertical pulse is amplified by transistor Q1 and results in transistor Q2 being continuously saturated by the presence of the vertical pulse. The collector of transistor Q2 is connected via resistor R5 to the base of transistor Q3 which is turned off when transistor Q2 is saturated. When the vertical pulse is lost, transistor Q2 rapidly turns off and the voltage at the collector of transistor Q2 which is also across the parallel combination of capacitor C2 and resistor R4 starts to decay towards ground. This decaying voltage is coupled to the base of transistor Q3 which turns on, generating signal Gk at the collector of transistor Q3. The grid kick trigger signal Gk is depicted by pulses B and D of exemplary FIG. 3, and is coupled to activate the exemplary grid kick circuit of FIG. 4. Pulses B and D of exemplary FIG. 3 have long decay times which is largely due to the time constant of capacitor C2 and resistor R4.

If the 12V supply to block 200 is lost, transistors Q1, Q2, and diode D1 turn off and the voltage across capacitor C2 is discharged towards ground by resistor R4. The voltage across capacitor C2 is coupled via resistor R5 to the base of transistor Q3 and when the voltage drops to about 10.4 volts causes transistor Q3 to turn on, generating signal Gk at the collector and activating the grid kick circuit. With the loss of the 12V supply, capacitor C3 is disconnected from the supply by diode D1 and provides power to the emitter of transistor Q3 to sustain conduction.

Figure 3:
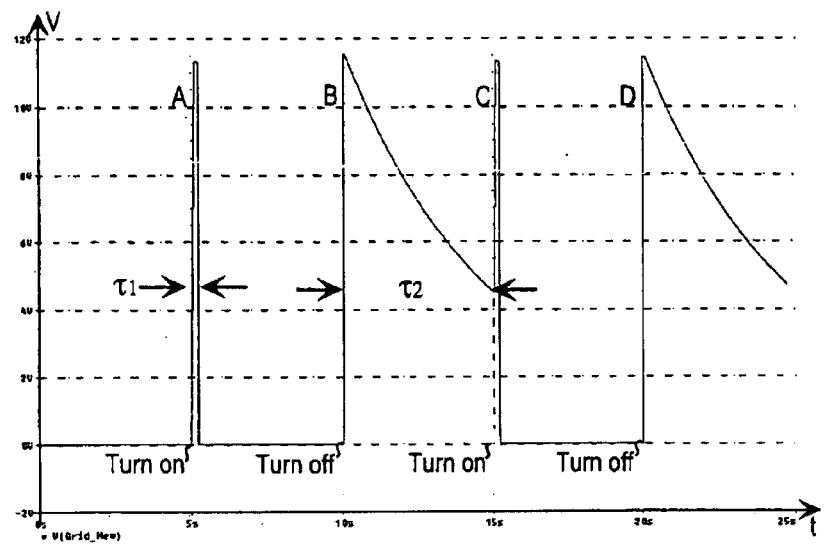
FIG. 3 shows trigger waveforms generated by the inventive phosphor protection arrangement of FIG. 2.

Display turn on is depicted by exemplary Gk pulse waveform A of FIG. 3. Capacitor C2 is connected between the collector of transistor Q2 and ground and was discharged by resistor R4 following display turn off. Thus at turn on capacitor C2 is slowly charged via resistor R5 and the base of transistor Q3, towards the 12 volt supply coupled to the anode of diode D1. This charging current sustains conduction in transistor Q3 for time period $\tau 1$ during which the grid kick circuit is activated. The duration, or rather the termination of Gk pulse A is determined by the conductive state of transistor Q2, which following establishment of the vertical pulse input to transistor Q1, transistor Q2 assumes a saturated state. With transistor Q2 saturated, capacitor C2 is rapidly charged via the collector of transistor Q2 to the 12 volt supply less the saturation voltage Vcesat. As the voltage across capacitor C2 rises it reaches a value nominally two PN junctions below the 12 volt supply (about 10.6 volts) at which point grid kick trigger transistor Q3 cuts off terminating beam cut off by the grid kick circuit.

As previously mentioned, at turn on grid kick pulse A is terminated by the appearance of vertical pulse Vp which causes transistor Q2 to saturate and discharge capacitor C2, and terminate pulse A. The desirability of facilitating different durations for start up grid blanking was discussed previously, but in simple terms, a hot start with a tricolor display tube is adequately protected by inventive circuit 200 shown in FIG. 2. However, with a cold start condition in a tricolor display tube, inventive circuit 200 provides phosphor burn protection but may not totally prevent the display of spurious images as the CRT and supplies stabilize. To provide different controllable durations for start up blanking the advantageous delay element depicted in block 250 is added in place of the broken line which supplies +12 volts to the collector of transistor Q2. Operation of delay element 250 is as follows. When started under cold start conditions capacitor C4 is discharged and thus holds transistor Q4 off and prevents current supply to transistor Q2. Capacitor C4 is charged via resistor R7 towards the positive supply and at some point the voltage across capacitor C4 is sufficient to allow transistor Q4 to conduct and supply current to transistor Q2 which then operates as described previously. Capacitor C4 continues to charged towards the +12 volt supply causing transistor Q4 to saturated and thereby present a low impedance to the current supply to transistor Q2. Thus the values selected for capacitor C4 and resistor R7 have an effect in determining the duration of turn on pulse A. Diode D2 provides a discharge path for capacitor C4 which ensures that start up blanking pulse A has the same duration for both hot and cold starts.

Under hot start conditions with a tricolor display tube the duration of blanking pulse A is advantageously shortened by the removal or omission of diode D2 which allows residual charge remaining in capacitor C4 to provide an earlier turn on for series pass transistor Q4. Thus in a warm tricolor display tube the turn on blanking is shortened in proportion to the quiescent time of the display. However in a projection cathode ray tube display the presence of diode D2 ensures that capacitor C4 is fully discharged regardless of hot or cold start conditions.

To provide protection against kinescope arcing capacitor C1 is connected between the collector and emitter of transistor Q2. Thus tube blanking at display turn on is achieved by keeping the base of transistor Q3 low as the power supplies assume their operating values. In the inventive turn on/turn off trigger generator 200 of FIG. 2, the grid kick circuit is triggered causing the beam to be cut off for different periods of time depending on whether the beam blanking is due to display turn on or a variety of turn off or failure events such as power supply or scan failure.

FIG. 3 shows an exemplary trigger voltage Gk generated at the collector of transistor Q3 and applied to trigger the grid kick circuitry during exemplary on off cycling of the display. It can be seen that trigger pulse A is of significantly shorter duration than pulse B or D which have durations in the order of five or more seconds. Pulse C represents a condition where the display is restarted shortly following a power off event, and shows that pulse C has a duration substantially similar to pulse A.

Figure 4:
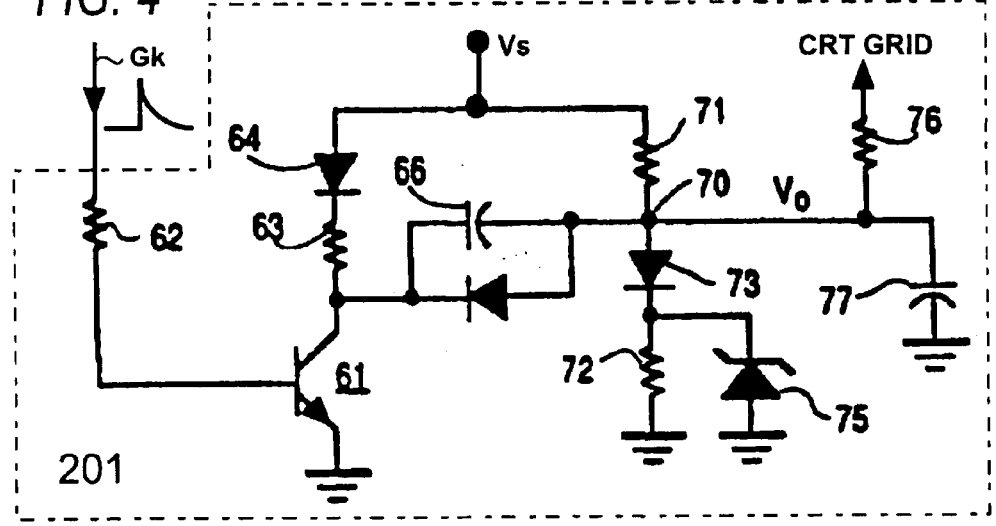
FIG. 4 depicts an exemplary CRT grid bias arrangement.

An exemplary grid kick or grid bias control shown in FIG. 4. During normal operation transistor 61 of the exemplary grid bias arrangement is biased off by control signal Gk. Under this condition capacitor 65 is charged by a current from resistor 63 and charges to a potential equal to the supply voltage Vs minus the potential at the output (node 70) of the potential divider. The values of resistors 71 and 72 in potential divider are selected to provide a specific output voltage Vo at circuit node 70, since the selection of the potential divider output voltage has a significant influence on the peak brightness of displayed image.

When triggered by signal Gk, transistor 61 turns on clamping the collector side of capacitor 65 to ground. However, capacitor 65 was charged during the normal operation to a potential equal to the supply voltage Vs (for example 200 volts) minus the potential divider output voltage (25 volts). Accordingly, when the collector side of capacitor 65 is clamped to ground responsive to control signal Gk, the other side of the capacitor assumes a negative potential of about 175 volts. This potential is applied to the grid G of the CRT and provides negative grid cut off thereby protecting the kinescope phosphor from spot burn. Under this condition diode 73 in the potential divider is reverse biased and resistor 72 and Zener diode 75 are both isolated from capacitor 65 thus resistor 71 provides the only discharge path for the capacitor 65.

What is claimed is:

1. A cathode ray tube video display comprising:
   a cathode ray tube for displaying a video signal coupled thereto;
   a cathode ray tube electron beam blanker coupled to said cathode ray tube and responsive to a blanking trigger signal blanking an electron beam within said cathode ray tube; and,
   a blanking controller coupled to said cathode ray tube electron beam blanker and generating said blanking trigger signal for controlling electron beam blanking, wherein said electron beam is blanked for different durations in accordance with one of a hot and cold start condition of said display.

2. A cathode ray tube video display comprising:
   a cathode ray tube for displaying a video signal coupled thereto;
   a cathode ray tube electron beam blanker coupled to said cathode ray tube and responsive to a blanking trigger signal blanking an electron beam within said cathode ray tube; and,
   a blanking controller coupled to said cathode ray tube electron beam blanker and generating said blanking trigger signal for controlling electron beam blanking, wherein said electron beam is blanked for different durations in accordance with one of a display turn on and display turn off condition of said display.

3. The cathode ray tube video display of claim 2, wherein at turn on said electron beam is blanked for a predetermined duration and at turn off said electron beam is blanked for a duration greater than said predetermined duration.

4. The cathode ray tube video display of claim 3, wherein said display is turned on within said duration greater than said predetermined duration, said electron beam blanking is removed.

5. The cathode ray tube video display of claim 1, wherein said electron beam is blanked for different durations in accordance with one of a turn on and turn off condition.

6. The cathode ray tube video display of claim 1, wherein said cathode ray tube forms part of a projection display and said electron beam is always blanked in accordance with said cold start condition.

* * * * *